United States Patent [19]

Andringa et al.

[11] 4,203,077

[45] May 13, 1980

[54] LASER RING RESONATOR WITH DIVERGENCE COMPENSATION

[75] Inventors: Keimpe Andringa, Richland, Wash.; Charles T. Pike, Lexington, Mass.

[73] Assignee: Jersey Nuclear Avco Isotopes, Inc., Bellevue, Wash.

[21] Appl. No.: 781,799

[22] Filed: Mar. 28, 1977

[51] Int. Cl.² .............................................. H01S 3/083
[52] U.S. Cl. ................................. 331/94.5 C; 356/350
[58] Field of Search ................... 331/94.5 C, 94.5 T, 331/94.5 D, 94.5 M; 356/106 LR

[56] References Cited

U.S. PATENT DOCUMENTS 3,757,247  9/1973  Giallorenzi et al. ............. 331/94.5 C Primary Examiner—William L. Sikes
Attorney, Agent, or Firm—Weingarten, Maxham & Schurgin

[57] ABSTRACT

A ring laser configuration operative to reduce divergence in the laser beam circulating within the ring and provided as an output. The ring laser configuration includes an odd number of reflectors in the ring path with one or more polarizer crystals for providing input and output coupling. The use of an odd number of reflectors creates an inversion in each pass of the radiation through a flowing active medium within the ring path to provide averaging of the divergence effects of the medium in the flow direction.

15 Claims, 2 Drawing Figures

LASER RING RESONATOR WITH DIVERGENCE COMPENSATION

FIELD OF THE INVENTION

The present invention relates to ring lasers and in particular to ring lasers which provide for a reduction in divergence.

BACKGROUND OF THE INVENTION

In laser systems used for isotope separation, particularly uranium enrichment, an exemplary system being shown in U.S. Pat. No. 3,944,947, it is typical to provide a ring laser configuration for use as a laser pulse stretcher. By nature, such a configuration provides for recirculation of a portion of the laser radiation within the ring many times through an active lasing medium in order to achieve the stretching function. Because radiation is thus multiply recirculated throughout the system, any system perturbations, particularly those causing divergence or spreading of the beam, get amplified on each pass.

In applications of enrichment, the ultimately produced radiation beam at the output of a series of laser amplifiers placed subsequent to a ring laser is intended for use over many meters of beam distance to selectively ionize or excite vapor particles. The limitation of divergence, to as near a diffraction limited spreading as is possible, becomes a desirable if not necessary goal in such circumstances.

In the case of dye lasers used for the enrichment purpose a flowing dye solution is excited through an extended linear region transverse to the flow direction. The radiation generated or amplified is subject to degradation in beam quality, divergence for example, due to imhomogeneities in the dye solution. This divergence is prone to be greater in the direction of medium flow due to the fluid effects which contribute to the inhomogeneities.

BRIEF SUMMARY OF THE INVENTION

In accordance with the teaching of the present invention a ring laser configuration is provided which acts to minimize or correct for divergence along a single axis in a beam of radiation amplified through a laser medium and reapplied after a predetermined time delay to the medium for further amplification and pulse elongation.

In particular, in the present invention, the beam is caused to traverse the laser medium on each pass in an orientation inverted with respect to its traversal in the previous pass. Diverging characteristics produced by medium variations are averaged throughout the beam resulting in improved beam quality. The inversion of beam location from pass to pass is provided by the utilization of an odd number of reflecting surfaces within the ring. The direction of inversion is preferably aligned with the flow direction to compensate for divergence in the direction where it is most severe.

In order to make use of such a scheme, coupling of an input beam to the ring laser configuration for pulse elongation as well as coupling of radiation from the ring configuration for output utilization is provided through the use of single or multiple window polarizers. In addition, the use of polarizer couplers permits the use of an adjustable feedback/output ratio by an adjustment in a wave plate provided to shift polarization within the ring and thereby define the degree of feedback available.

BRIEF DESCRIPTION OF THE DRAWING

These and other features of the present invention are more fully set forth below in the detailed description, presented solely for purposes of illustration and not by way of limitation, and in the accompanying drawing of which.

DETAILED DESCRIPTION OF THE INVENTION

The present invention contemplates a system for reducing beam divergence induced largely along a single direction in a lasing medium employed in a ring configuration for pulse stretching. The present invention provides this feature in a ring laser havng an odd number of path reflections to invert the orientation of the beam in each pass through an active lasing medium of the ring and with a coupling technique advantageously employed with such a ring laser configuration. The invention further permits an adjustment in the feedback percentage of the ring. More particularly, where beam divergence is particularly troublesome in the flow direction of a flowing medium laser due to nonuniformities in the laser medium, the ring configuration accordng to the present invention provides laser feedback in that plane to reduce the divergence at its most troublesome point.

Figure 1:
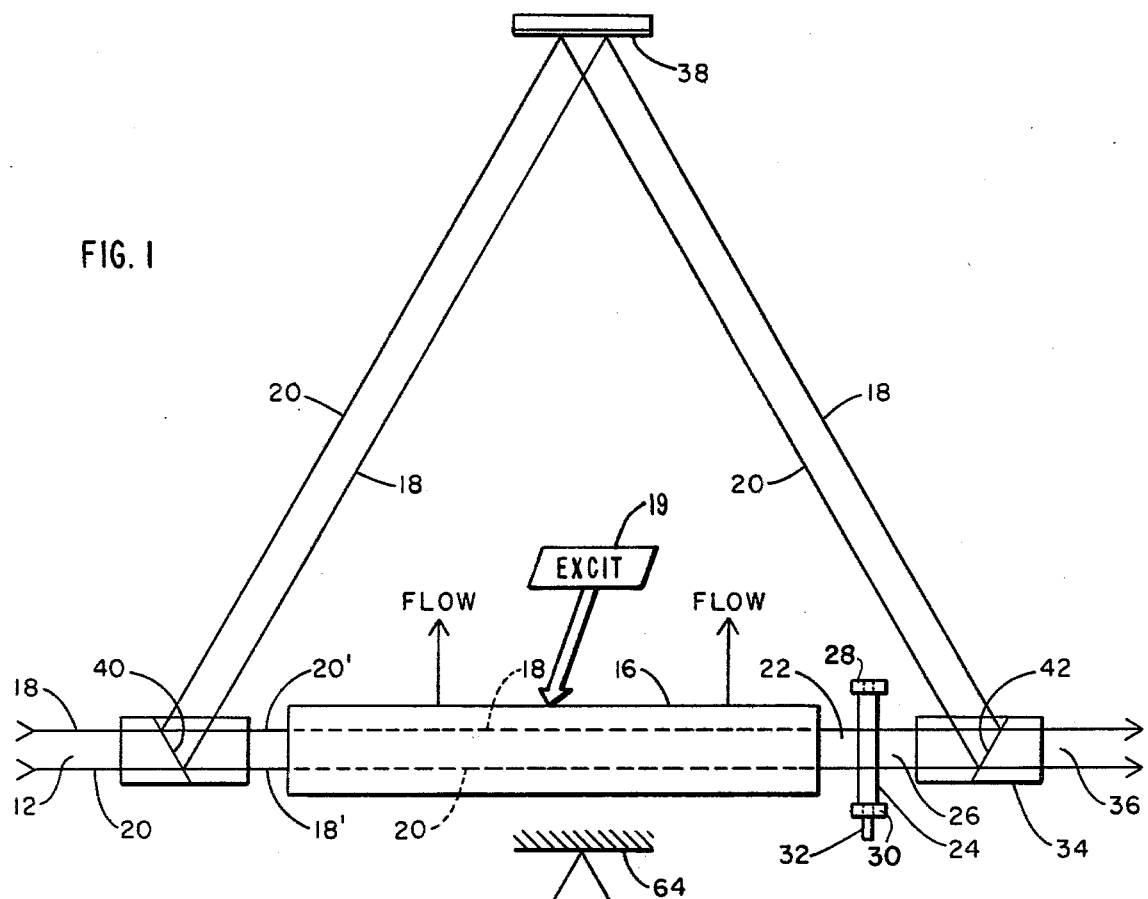
FIG. 1 is a diagram of a ring laser according to a first embodiment of the present invention.

The present invention may best be understood by reference to the drawings with the plane of the drawing being the vertical plane. FIG. 1 shows an input beam 12 applied through a single window Glan Thompson polarizing crystal 14 in an active laser medium flowing in the plane of the drawing through an active region 16. The beam 12 is shown in FIG. 1 to have an upper end 18 and lower end 20 which are maintained in that relationship in passing through the laser region 16. The laser medium is typically a dye solution although not necessarily so limited. The medium, when excited by flashlamp or laser means 19, provides an amplification of the radiation in input beam 12 to provide sufficient additional energy to permit feedback and thereby pulse elongation as for example shown in U.S. Pat. Nos. 3,914,709 and 3,902,130.

The radiation in the beam 12 as amplified by the medium in region 16 passes as an output beam through a wave plate 24 providing an adjustable retardation of the plane of polarization. In preferred embodiment, the radiation in the beam 12 is vertically polarized so that the radiation passing through the wave plate 24 is retarded to provide in general an elliptically polarized beam havng both a horizontal and a vertical component in the output beam 26.

The wave plate 24 is supported in bearings 28 and 30 which permit rotation of the wave plate 24 as by a handle 32 permitting adjustment in the portion of horizontally and vertically polarized radiation.

The beam 26 is applied to a secnd single window Glan Thompson polarizing crystal 34 in which the vertically polarized radiation passes as an output beam 36 while the horizontally polarized component is reflected upward through the crystal window in an acute angle to a mirror 38, typically a 100% reflecting mirror, which redirects the radiation toward the first polarizing crystal 14 and in particular along the angle of the side window thereof for reflection at a zone 40 back into the active lasing region 16 as horizontally polarized. The horizontal and vertical polarizations will alternate in each pass, and after several passes, a steady state condition in the output and feedback beams is achieved.

Typically, the input beam 12 is a single pulse of several nanoseconds duration which is applied to the medium 16 and amplified thereby. A portion is provided as the output beam 36 from the second polarizer crystal 34. A complimentary portion of this radiation is however reflected by a polarization sensitive reflecting zone 42 in the second polarizing crystal 34 toward the mirror 38 and in turn re-reflected by the zone 40 for a subsequent pass through the active lasing region 16 thereby generating a further, subsequent pulse for amplification by the medium. On each traversal through the ring an additional pulse is generated and the output beam 36 thus provides a sequence of pulses in response to the single input pulse 12. The result is a stretching of the pulse duration. The length of the ring path is preferably adjusted so that the sequence of pulses tend to merge into a sngle elongated pulse.

Since any lasing medium will provide a divergence due to perturbations or inaccuracies in the medium or associated components, the use of a multiple pass technique or ring laser as illustrated in FIG. 1 results in the reamplification of the diverging characteristic with each pass. The configuration of FIG. 1, however, operates to minimize this difficulty through the use of an odd number of reflecting surfaces, such as zones 40 and 42 and mirror 38. By tracing rays, or edges 18 and 20, in the original input beam 12 in FIG. 1, it can be seen that where as the edge 18 is uppermost in the first traversal it becomes, after the odd number of reflections, reapplied to the medium in the location of the lowermost edge 20. Thus, any upper, or lower, divergence producing variation in the medium, particularly severe in the flow direction, is averaged throughout the beam by the repeated reversals. Overall beam quality after several passes through the medium is thus maintained higher than it would otherwise be.

Where it has been observed that the divergence characteristic in a horizontal feedback vertical flow, vertically polarized ring laser tends to be aggravated in the vertical direction because of nonuniformities in the laser medium, the ring laser feedback configuration of FIG. 1 is oriented in the vertical plane so that the corrective effect is applied in the plane where the greatest diverging characteristic is noted.

The use of polarizing crystals 14 and 34 is particularly advantageous because a vertically polarized input beam can enter the ring amplifier without attenuation, for superposition onto the ring laser radiation paths.

Figure 2:
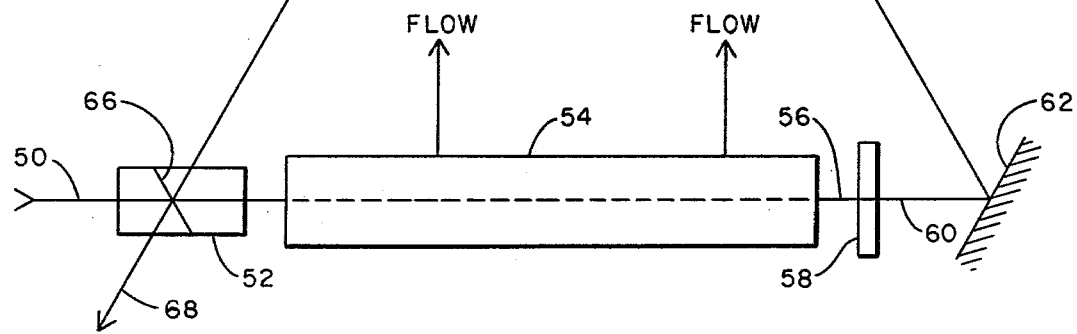
FIG. 2 is a diagram of a ring laser accordng to a second embodiment of the present invention.

With reference to FIG. 2, there is shown a second embodiment of the present invention in which the use of two polarizer crystals is avoided by the use of a single, double window Glan Thompson polarizer crystal. In accordance with the embodiment of FIG. 2, an input beam 50 of vertical polarization is applied through the double window polarizer crystal 52 without reflection or alteration to a laser medium 54 where it is amplified. The amplified beam 56 is applied through an adjustable quarter wave plate 58 which provides a predetermined portion of horizontally polarized radiation in the beam 60 emerging therefrom. Beam 60 is reflected twice by 100% reflecting mirrors 62 and 64 back toward the polarizing crystal 52 at a first window thereof receptive to the horizontally polarized radiation for reflection thereof at a zone 66 back to the medium 54 and for transmission of the vertically polarized portion through a second window thereof to provide an output beam 68. The use of the double window crystal 52 provides a reduction in the number of critical components and cost in the manufacture of the ring laser configuration.

It is, of course, to be noted that while illustrated with only three reflective surfaces within the ring, it is possible to employ another number of reflective surfaces so long as the total number of reflections is odd.

The above-described preferred embodiment for the present invention is to be seen as presented solely for purposes of illustration, modifications and improvements thereof to be considered to fall within the scope of the present invention as defined in accordance with the following claims.

What is claimed is:

1. A ring laser comprising:
   a laser medium having there through a laser medium path for radiation to traverse said medium;
   means for exciting said medium to a lasing condition;
   an input beam path for laser radiation;
   reflecting means along said laser medium path, for providing reflections in said laser beam path to reapply laser radiation along said laser medium path to said laser medium after an odd number of reflections in a configuration to invert the reapplied radiation from side to opposite side, said reflecting means including polarizer crystal means including at least one window for injecting laser radiation from said input beam path, into said medium for amplification thereby; and at least one window for transmitting a portion of the radiation from said laser medium to an output beam path;
   means provided along said laser medium path for changing the polarization in radiation on said laser medium path.

2. The ring laser of claim 1 wherein said polarizer crystal means comprises a double window Glan Thompson polarizer with each window operative respectively as said injecting means and said transmitting means.

3. The ring laser of claim 1 wherein said polarizer crystal means comprises two single window Glan Thompson polarizer crystals along said laser medium path respectively on either side of said laser medium.

4. The ring laser of claim 1 wherein said polarization changing means includes means for providing an adjustable retardation in the polarization of the radiation passing from said medium.

5. The ring laser of claim 1 wherein said polarization changing means is adapted to provide elliptical polarization in the radiation passing from said medium.

6. The system of claim 1 wherein said polarization changing means is rotatable about the axis of radiation passing therethrough.

7. The ring laser of claim 1 wherein said reflecting means are located in a vertical plane and said input beam has vertically polarized radiation thereon.

8. The ring laser of claim 1 wherein said medium including means for producing a substantially greater divergence in the direction defined by orthogonals to the inverted sides of said reapplied laser medium path.

9. The ring laser of claim 8 wherein said laser medium includes a medium flowing transverse to the direction of passage of said laser medium path therethrough.

10. The ring laser of claim 9 wherein the direction of flow of said medium is the same as the direction defined by the orthogonals to the inverted sides of said laser medium path.

11. The ring laser of claim 9 wherein said medium is a dye solution.

12. A ring laser comprising:
   a flowing laser medium having a laser medium path therethrough;
   means including a first single window polarizer in an input beam path for receiving and applying radiation on said input beam path along said laser medium path to said laser medium transverse to the flow direction for amplification;
   said input beam path of laser radiation having a first, predetermined polarity direction;
   means for exciting the laser medium to provide amplification of radiation on said medium path;
   a wave plate in said medium path to provide a component of polarized radiation on the medium path orthogonal to said first polarity direction;
   a second single window polarizer in the medium path beyond said wave plate and havng a window for reflection of the radiation orthogonally polarized in said medium path and for transmitting a portion of said radiation along an output path extending beyond said second polarizer;
   means operative in response to radiation reflected through the window of said second polarizer for reflecting that radiation into the window of said first polarizer for reapplication to said laser medium.

13. The ring laser of claim 12 wherein the windows of said first and second polarizers are oriented to reflect in a vertical plane.

14. A ring laser comprising:
   a flowing laser medium having a medium path therethrough for radiation;
   means includng a double window polarizer with a reflection zone oriented to pass a predetermined radiation polarization on an input beam path along said medium path through said laser medium transverse to its flow direction;
   means for exciting said laser medium to provide amplification of radiation on said medium path;
   means in the medium path for providing a component of radiation polarized orthogonally to said predetermined polarization;
   means along said medium path and operative in response to the amplified radiation for reflecting the amplified radiation an even number of times to direct radiation on said medium path through a first window of said double window polarizer for reflection back toward said laser medium in part and for transmission through a second window of said polarizer in a further part.

15. The ring laser of claim 14 wherein said reflecting means and said first window of said polarizer are oriented to provide reflection of amplified radiation from said laser medium in a vertical plane for reapplication to said laser medium through said first window of said double window polarizer.

* * * * *

UNITED STATES PATENT AND TRADEMARK OFFICE
CERTIFICATE OF CORRECTION

PATENT NO. : 4,203,077
DATED : May 13, 1980
INVENTOR(S) : Keimpe Andringa, et al.

It is certified that error appears in the above—identified patent and that said Letters Patent is hereby corrected as shown below:

Column 1, line 36, "imhomogeneities" should read --inhomogeneities--.

Column 2, line 61, "secnd" should read -- second --.

Column 3, line 22, "sngle" should read --single--.

Signed and Sealed this

Fifteenth Day of March 1983

[SEAL]

Attest:

GERALD J. MOSSINGHOFF

Attesting Officer

Commissioner of Patents and Trademarks